United States Patent
Chen et al.

[11] Patent Number: 5,242,784
[45] Date of Patent: Sep. 7, 1993

[54] SYSTEM AND METHOD FOR OPTICAL PHASE CHANGE RECORDING

[75] Inventors: Martin Y. Chen, San Jose; Kurt A. Rubin, Santa Clara, both of Calif.

[73] Assignee: International Business Machines Corporation, Armonk, N.Y.

[21] Appl. No.: 902,544

[22] Filed: Jun. 22, 1992

Related U.S. Application Data

[63] Continuation-in-part of Ser. No. 554,052, Jul. 13, 1990, abandoned.

[51] Int. Cl.$^5$ ............... G03C 1/72; G03C 1/78
[52] U.S. Cl. ...................... 430/496; 430/19; 430/495; 430/395; 430/523; 430/525; 430/273; 430/945; 430/964; 346/135.1; 369/275.2; 369/284
[58] Field of Search ............... 430/19, 525, 496, 964, 430/395, 945, 495, 271, 272, 273, 523; 369/275.2, 284; 346/135.1

[56] References Cited

U.S. PATENT DOCUMENTS

| | | | |
|---|---|---|---|
| 4,216,501 | 8/1980 | Bell | 358/128.5 |
| 4,576,895 | 3/1986 | Barton et al. | 430/270 |
| 4,635,245 | 11/1987 | Smith | 369/275 |
| 4,644,519 | 2/1987 | Markvoort et al. | 369/275 |
| 4,660,175 | 4/1987 | Strand | 365/113 |
| 4,709,363 | 11/1987 | Dirks et al. | 369/275 |
| 4,719,594 | 1/1988 | Young et al. | 365/113 |
| 4,839,883 | 6/1989 | Nagata et al. | 369/286 |

FOREIGN PATENT DOCUMENTS

| | | |
|---|---|---|
| 0181005 | 11/1985 | European Pat. Off. . |
| 0212336 | 7/1986 | European Pat. Off. . |
| 1079973 | 3/1989 | European Pat. Off. . |
| 0347801 | 6/1989 | European Pat. Off. . |

*Primary Examiner*—Richard L. Schilling
*Attorney, Agent, or Firm*—Douglas R. Millett

[57] ABSTRACT

An optical phase change media comprises a substrate, an active layer having a crystalline and a liquid state, a dielectric layer and a reflective layer. The active layer is of a thickness which will transmit incident light. The dielectric layer is of a thickness such that light passing through the active layer is reflected by the reflective layer and destructively interferes with the incident light reflected directly off of the active layer, thereby causing the crystalline state of the active layer to absorb more light than the liquid state. The result is that the media experiences reduced temperature during writing.

42 Claims, 3 Drawing Sheets

SYSTEM AND METHOD FOR OPTICAL PHASE CHANGE RECORDING

This is a continuation in part of Ser. No. 07/554,052 filed Jul. 13, 1990 now abandoned.

TECHNICAL FIELD

1. Background of the Invention

This invention relates to optical recording media and more particularly to optical phase change media.

2. Description of the Prior Art

The two most popular methods of reversible optical recording are magneto-optic recording and phase change recording. In magneto-optic recording, the recording media has an active or recording layer which may be magnetized in either an up or down position when a laser beam heats the material above a certain temperature. The recorded data is read from the media by use of a low powered laser beam which provides polarized light which is reflected off of the media. The different directions of magnetization in the media cause the plane of polarization of the light to be rotated in one direction or the other. This is known as the Kerr effect. These differences in rotation are detected as data ones and zeros.

In contrast to magneto-optic recording, phase change recording directly uses differences in the reflectivity of the media to detect data. Phase change media is usually comprised of a transparent substrate, an undercoat, an active layer and an overcoat. The active or recording layer has a crystalline state, a liquid state and an amorphous state. Initially, the active layer is in the crystalline state. The amorphous state is formed by heating a portion or spot of the active layer with a high power laser pulse of short duration to a temperature above its melting point to change it to a liquid state. If the spot cools sufficiently rapidly it changes to the amorphous state. When an amorphous spot is heated with a lower powered laser, the amorphous material returns to its crystalline state. To read the media, a very low power laser is reflected off of the active layer. The crystalline state has a higher reflectivity than the amorphous state and this difference in reflectivity is detected as data ones and zeros.

Some examples of prior art optical media include U.S. Pat. No. 4,216,501 issued Aug. 5, 1980 to Bell; U.S. Pat. No. 4,576,895 issued Mar. 18, 1986 to Barton, et al.; U.S. Pat. No. 4,635,245 issued Jan. 6, 1987 to Smith; U.S. Pat. No. 4,644,519 issued Feb. 7, 1987 to Markvoort, et al.; U.S. Pat. No. 4,660,175 issued Apr. 21, 1987 to Strand; U.S. Pat. No. 4,709,363 issued Nov. 24, 1987 to Dirks, et al.; U.S. Pat. No. 4,719,594 issued Jan. 12, 1988 to Young, et al.; and U.S. Pat. No. 4,839,883 issued Jun. 13, 1989 to Nagata, et al.

One problem encountered with these prior art phase change media is that they have a very limited cycle life. After a certain number of write and erase cycles, the media starts to degrade until it can no longer be written or read reliably. It is believed that repeated high temperatures during the writing (amorphization) process are responsible for the limited cycle life.

When a disk is written upon (amorphized), a high powered laser is focused onto the media. The media is initially in the crystalline state. The laser light focused on the media has a Gaussian shaped intensity profile. The temperature is hottest at the center of the laser spot on the disk, while the edge of the molten spot is at the melting point of the media. Typically, the diameter of a written spot is equal to the diameter of the molten spot, which in turn is approximately equal to the full width at half the maximum intensity of the laser beam (FWHM). The center of the spot will reach more than twice the temperature of the melting point.

An additional temperature problem is caused by the difference in reflectivities of the different states. If the active layer is $(GeTe)_{85}Sn_{15}$, otherwise known as GTS, then the melting point is 725° C. The reflectivity of the amorphous state of GTS is only 28% compared to 49% for the crystalline state. The reflectivity of the liquid state is approximately equal to the reflectivity of the amorphous state. This means that once the spot becomes liquid or molten, it will absorb even more light and will become even hotter.

For a media made of GTS, temperatures of 1740° C. in the center of the spot are estimated. At this temperature, the media boils due to vapor pressure of the active layer and contaminates become a significant factor in causing stress on the film. Also, thermal expansion differences can become important. Either of these effects can result in delamination occurring at one of the interfaces between the different layers of the media. This repeated process of writing and erasing limits the life of the media. What is needed is a phase change media with an improved cycle life.

SUMMARY OF THE PRESENT INVENTION

Towards this end and according to the invention, an optical phase change media comprises a substrate, an undercoat layer, an active layer having a liquid and a crystalline state, a dielectric layer, and a reflective layer. The active layer has a thickness which will allow the transmission of incident light. The dielectric layer has a thickness such that the light passing through the active layer is reflected by the reflective layer and destructively interferes with the light reflected directly off the active layer in a way that the reflectivity of the liquid state will be higher than that of the crystalline state The result is that media will experience a greatly reduced temperature during writing because the melted media will absorb less light.

For a fuller understanding of the nature and advantages of the present invention reference should be made to the following detailed description taken in conjunction with the accompanying drawings.

DESCRIPTION OF THE PREFERRED EMBODIMENTS

Figure 1:
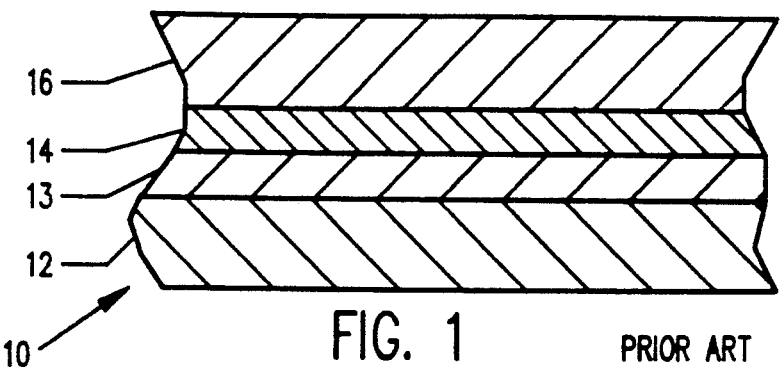
FIG. 1 is a schematic cross sectional view of an optical phase change media of the prior art.

FIG. 1 shows a schematic cross sectional view of one example of an optical phase change media of the prior art and is designated by the general reference number 10. Media 10 comprises a substrate 12 which is made of glass or a transparent plastic such as polycarbonate. The substrate 12 is typically 1.2 mm thick. An optional undercoat layer 13 is located on substrate 12. Layer 13 is made of a dielectric material and is typically 2000 Å thick.

An active layer 14 is located on top of layer 13. Active layer 14 is made of a chalcogenide material. In their bulk or ordinary condition these materials have a crystalline state which is more reflective than the amorphous or liquid state. In other words, the bulk reflectivity of the crystalline state is greater than the bulk reflectivity of the amorphous state. One such material is GTS. The active layer 14 is typically 400 Å–1000 Å thick.

An overcoat layer 16 is located above active layer 14. Overcoat layer 16 is made of a low thermal conducting, high melting point dielectric material such as glass and is usually approximately 2000 Å thick. The overcoat layer 16 constrains the active layer from flowing while it is liquid.

In order to write on (amorphize) media 10, a laser beam is passed through substrate 12 to active layer 14. The active layer 14 is initially in the crystalline state. The laser heats a spot on the active layer to above its melting point and changes it to a liquid state. Once the laser light is removed the spot will cool to the amorphous state from which the data will later be read. For GTS the melting point is 725° C. GTS is 28% and 49% reflective of 647 nm light, in the liquid and crystalline states, respectively. The absorption of the liquid and crystalline states are 72% and 51%, respectively. The sum of the reflectivity (R) and absorption (A) of a material is equal to one. The laser beam pattern on the disk has a Gaussian intensity profile, i.e. the beam is more intense at the center and less intense at the edges of the spot on the disk.

The diameter of the recorded spot is approximately equal to the full width at half the maximum intensity (FWHM), i.e. the diameter at the location in the beam pattern where the light is half the intensity of the maximum intensity of the light in the center of the beam. The temperature at the center will be at least twice the melting point temperature at the edge. The relative absorption of the liquid and crystalline states increases the temperature even further. Once the crystalline state is changed to the liquid state, the absorption rate jumps from 51% to 72%. The result is that for GTS, the temperature at the center of the beam pattern can reach 1740° C. At this temperature degradation of the media occurs and cycle life is limited.

The present invention results in a structure which minimizes the ratio of light absorbed by the liquid or amorphous state (Al) to that of the light absorbed by the crystalline state (Ax). This ratio, Al/Ax will be referred to as Ar.

Minimization of Ar results in a form of heating rate governor which reduces the temperature rise of the molten region during laser illumination. The invented structure is designed so that the active layer is part of an optical interference structure that has less light absorption in the liquid state than in the crystalline state. This allows the laser light to heat the crystalline state to its melting point more quickly. Once the material melts, the higher reflectivity molten part of the spot absorbs less laser light so that the heating rate drops dramatically. The melted part of the spot does not continue to heat as fast as the surrounding, not yet melted, crystalline region of the spot.

Figure 2:
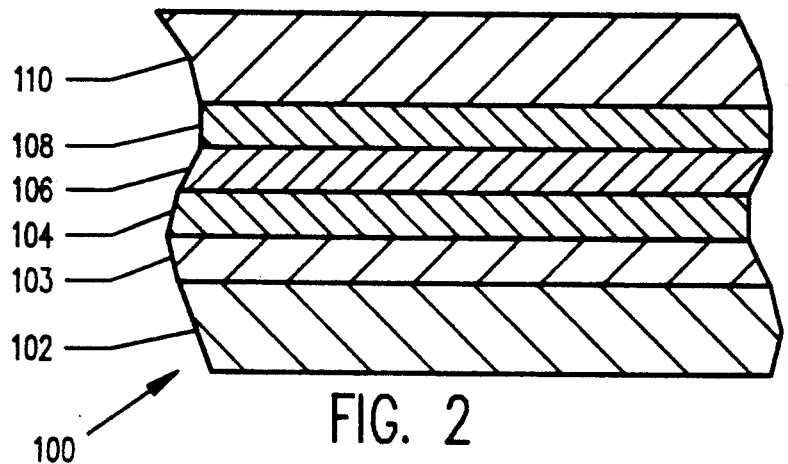
FIG. 2 is a schematic cross sectional view of the optical phase change media of the present invention.

FIG. 2 shows a schematic cross sectional view of an optical phase change media of the present invention and is designated by the general reference number 100. Media 100 comprises a substrate 102 which may be made of glass or a transparent plastic such as polycarbonate. Other materials which may be used for the substrate include polymethylmethacylate, amorphous polyolefin, polycarbonate/polystyrene blends, epoxies, polycarbonate/monomer blends and methylmethacylate blends. Substrate 100 is preferably 1.2 mm thick. An optional undercoat layer 103 may be located above substrate 102. The preferred embodiment of layer 103 is made of glass or other suitable dielectric material and is preferably 1500 to 3500 Å thick.

An active layer 104 is located on top of layer 103. Active layer 104 may be made of a chalcogenide material such as GTS. Layer 104 may be 100 Å thick in the preferred embodiment.

A transparent dielectric layer 106 is located on top of layer 104. Dielectric layer 106 may be made of 7059 glass or other suitable dielectric material and is 1750 Å thick in a preferred embodiment.

A reflective layer 108 is located on top of layer 106. Reflective layer 108 may be made of a metallic material such as aluminum, silver or copper or other highly reflective materials. reflective layer 108 is 1000 Å thick in the preferred embodiment.

An overcoat layer 110 is located on top of layer 108. The preferred embodiment of layer 110 is made of glass or other suitable dielectric material and is 1 mm thick.

The media 100 may be made by depositing or sputtering each successive layer 103-108 onto the substrate 102. Protective layer 110 is then deposited on top of layer 108. Layer 110 may be attached to layer 108 by a suitable adhesive.

In operation, laser light passes through substrate 102 and layer 103 and reaches active layer 104. A portion of the light is reflected at layer 104, a portion is absorbed by layer 104 and the remaining light passes through layer 104, through dielectric layer 106, and is reflected at reflective layer 108. This reflective light then returns through layers 106 and 104 and then destructively interferes with the light which was directly reflected off of layer 104. By choosing the materials and the thicknesses of the layers 106 and 108, the Ar achieved is less than 1. In other words, the reflectivity of the liquid and crystalline states are reversed from their bulk values and that of the prior art. In the preferred embodiment of the media described above, reflectivity of liquid and crystalline states are 60% and 35%, respectively. This difference in reflectivity is sufficient for data detection by a standard type of disk drive. At the same time, the media now automatically limits the temperature because as it melts, the liquid state reflects more and absorbs less light. When the laser light is removed the media will cool to the amorphous state which has approximately the same reflectivity as the liquid state.

Figure 3:
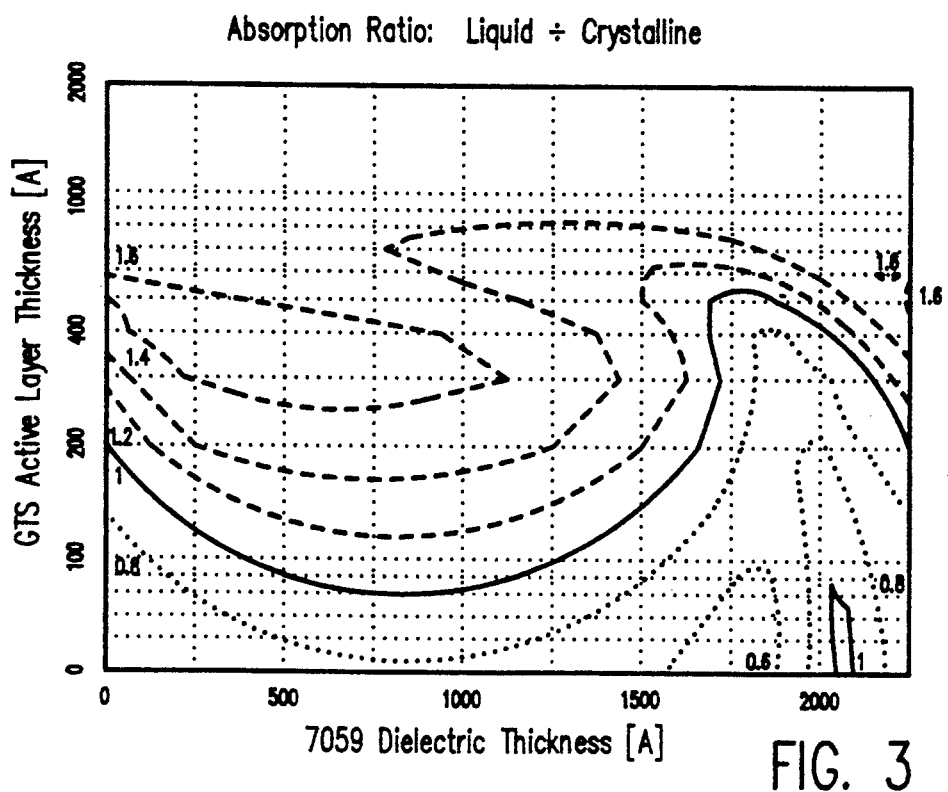
FIG. 3 is a graph of active layer thickness versus dielectric layer thickness at different absorption ratios.

FIG. 3 shows a graph of active layer thickness versus dielectric layer thickness at different absorption ratios (Ar). The structure of the media used in FIG. 3 was a glass substrate, a GTS active layer, a 7059 glass dielectric layer and a 1000 Å thick aluminum reflective layer.

The optional undercoat layer was not present. Light of wavelength 647 nm was assumed to be normally incident through the substrate onto the active layer. The thickness of both active and dielectric layers was varied systematically and the ratio Ar was calculated for each thickness combination.

The results for the Ar as shown in FIG. 3 are that the thicker active layers absorb more light in the liquid state. There is a set of active layer and dielectric layer thickness values where Ar is equal to one. The structure constructed with thickness of active layer and dielectric layer falling on that line (Ar=1) will have identical absorption for the liquid and crystalline states. However, it is a region where no contrast is observed. The best region to operate is where the Ar is at a minimum. In FIG. 2 the Ar is less than 0.6 for thin active layers and for a dielectric layer thickness intermediate between approximately 1600 and 1800 Å. The result is that the heating rate of the molten part of the irradiated spot is less than 60% of the surrounding crystalline region. This is in contrast to a conventional structure (Ar=1.5), where the heating rate of the melted region increases by as much as 60% above the crystalline region.

From FIG. 3 we see that if the active layer is chosen to be 100 Å thick, the dielectric layer should be approximately 1750 Å thick to minimize Ar. The liquid and crystalline states reflectivity are 60% and 35%, respectively. The reflectivity of the amorphous state is approximately equal to the reflectivity of the liquid state. These reflectivities are quite reasonable for actual detection by a disk drive. It would allow sufficient light to be reflected for focus tracking and data detection and does not require too much power for writing and erasing data.

Figure 4:
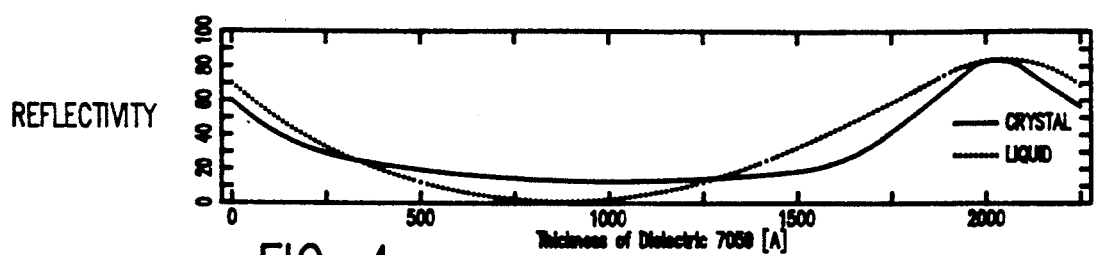
FIG. 4 is a graph of the reflectivity versus dielectric thickness for the present invention.

FIG. 4 shows a graph of reflectivity versus thickness of the dielectric layer for both the crystal and liquid states. The media used was the same as described in connection with FIG. 3 with a 100 Å thick GTS active layer. At 1750 Å thickness of the dielectric layer, the liquid state has its maximum reflectivity difference over the crystalline state.

Figure 5:
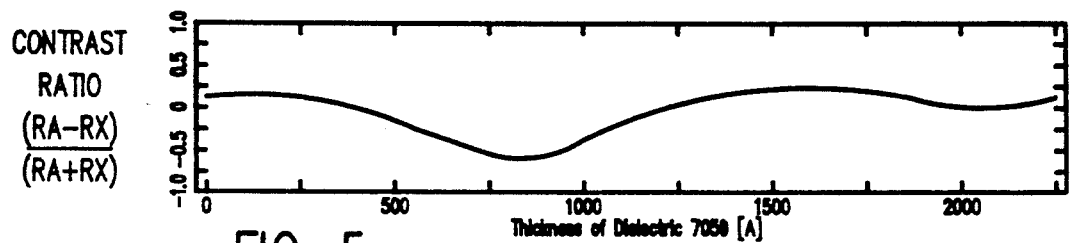
FIG. 5 is a graph of contrast ratio versus dielectric layer thickness for the present invention.

FIG. 5 shows a graph of contrast ratio versus thickness of the dielectric layer. The media used is the same as described as that in connection with FIG. 4. The contrast ratio is the reflectivity of the amorphous state (RA) minus the reflectivity of the crystalline state (RX) divided by the sum of the reflectivities of the amorphous and crystalline states. The contrast ratio is determined by reading the disk after it has been written upon. Therefore the amorphous state and not the liquid state is present. However, the reflectivity of the amorphous state is approximately equal to the reflectivity of the liquid state. The maximum contrast of 0.2 is obtained at 1750 Å dielectric thickness.

Figure 6:
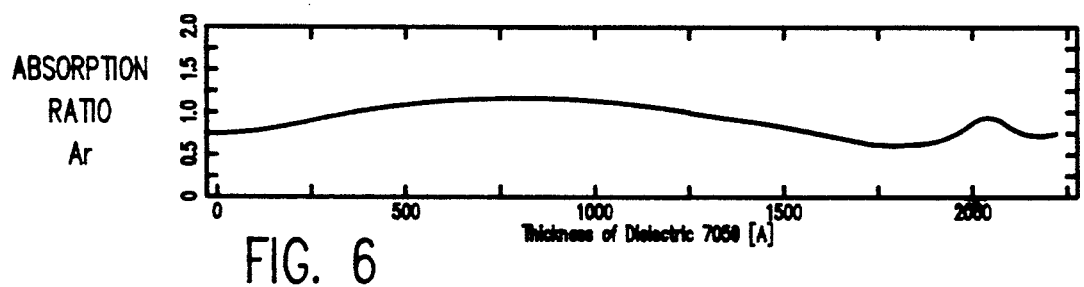
FIG. 6 is a graph of absorption ratio versus dielectric layer thickness for the present invention.

FIG. 6 shows a graph of absorption ratio (Ar) versus thickness of dielectric layer. The media is as that described in connection with FIG. 4.

Some of the prior art, U.S. Pat. No. 4,216,501 issued to Bell, for example, also use dielectric and reflector layers behind the active layer. However, these prior art devices all have Ar>1 and are in fact designed to maximize the Ar so as to better distinguish the data ones and zeros. However, by maximizing the Ar, the media of the prior art have the temperature problems discussed earlier because the liquid state will absorb much more light than the crystalline state.

In contrast, the present invention uses the optical properties of the active layer, dielectric layer and reflective layer to minimize the Ar. The liquid state of the active layer of the present invention absorbs much less light than the crystalline state. This solves the temperature problem and enables the media to have a longer life.

The dielectric layer thickness is chosen to minimize the ratio of liquid to crystalline state light absorption (Ar). This thickness can be increased in integer multiples of $\lambda/2n$ (where $\lambda$=wavelength and n=index of refraction of the dielectric layer 106) and still result in the optical effect (Ar<1). The thickness of the active layer can be adjusted to satisfy processing considerations provided it is thin enough to allow optical interference to reverse the reflectivity of the liquid and crystalline states from their bulk values.

The present invention will work with materials other than the ones specified in the preferred embodiment. The procedure for choosing the active layer thickness and the dielectric layer thickness is the same. A calculation of the ratio of absorption of light by the liquid and crystalline states is performed using the optical constants of the chosen materials. The thickness of the layers is chosen to minimize this ratio. Any high reflecting mirror material can be used in the reflective layer. Examples include aluminum, silver, gold, copper, platinum and chromium.

Figure 7:
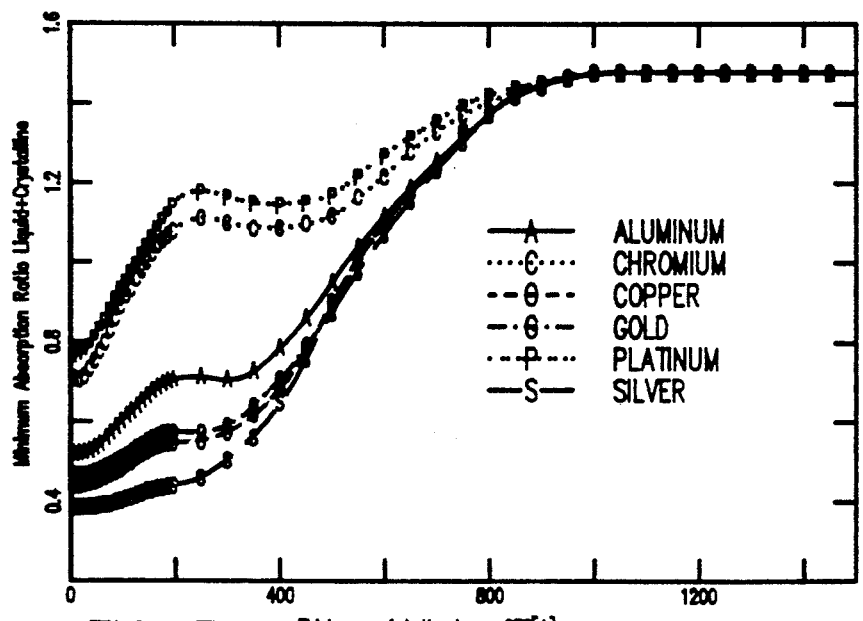
FIG. 7 is a graph of minimum absorption ratios versus dielectric layer thickness for various reflector materials for the present invention.

FIG. 7 shows a graph of minimum absorption ratio versus thickness of a GTS active layer for different reflective layer materials. The media has glass substrate, a GTS active layer, a 1750 Å thick 7059 glass dielectric layer and a 1000 Å thick reflective layer. Silver gives the lowest value of Ar. For example, keeping a structure the same except for substituting a silver for an aluminum reflective layer, a lower value for Ar of 0.41 for a 100 Å thick active layer is obtained. The heating rate of the molten state is 41% of that of the crystalline state.

A number of materials may be used for the dielectric layer as long as they are reasonably transparent so optical interference can occur. Some materials would include $SiO_2$, $ZnS$, $MgF_2$ and $Al_2O_3$ or mixtures of these.

It was noted that the media of the prior art has active layer temperatures approaching 1740° C. Using the structure of the present invention, with a silver reflector, a 1750 Å thick 7059 glass dielectric layer, and a 100 Å thick GTS active layer, the temperature at the center of the molten spot reaches only 1015° C. when the edge, defined by the FWHM diameter of the incident beam, reaches 725° C. This 725° C. reduction in maximum temperature is quite significant and results in a much longer media life. This is achieved without reducing the laser power and retaining the same large spot size.

Figure 8:
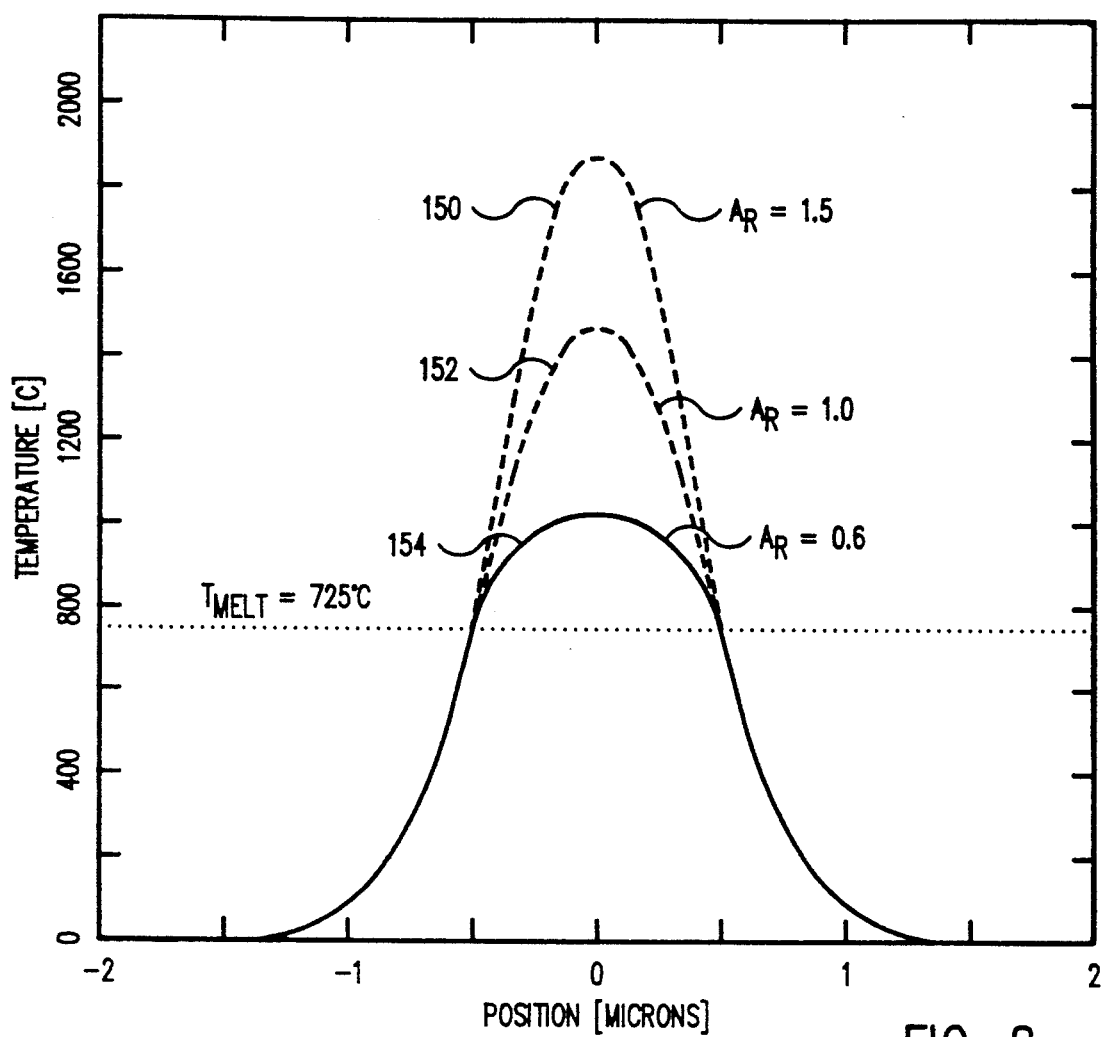
FIG. 8 is a graph of the temperature versus spot position.

FIG. 8 shows a graph of the temperature versus position in a beam spot focussed on an active layer. A line 150 represents the media of the prior art (Ar=1.5). A temperature of 1740° C. is obtained at the center of the spot. A line 152 represents a media in which the reflectivities of the crystalline and liquid state are the same (Ar=1.0). A temperature of 1450° C. is obtained at the center. A line 154 represent the media 100 of the present invention (Ar=0.6). The temperature at the center reaches only 1015° C.

Figure 9:
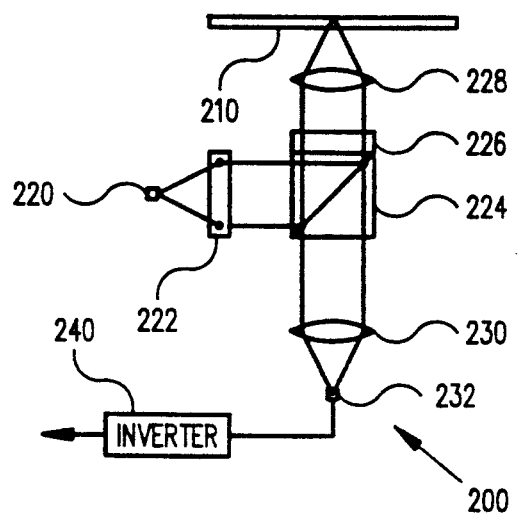
FIG. 9 is a schematic diagram of a data storage system using the media of the present invention.

FIG. 9 shows a schematic diagram of a data storage system and is designated by the general reference number 200. Drive 200 is designed for use with a disk media of the present invention. A disk 210 is shown which is made similar to media 100 of FIG. 2.

A laser diode 220 provides light to an optical collimator 222, such as a lens. The collimated light is then passed to a polarizing beam splitter 224 and is directed through a quarter-wave plate 226 and an objective lens 228. Objective lens 228 focuses the light on to disk 210.

The light reflected off of disk 210 passes through lens 228, quater-wave plate 226 and polarizing beam splitter 224 to a detector lens 230. Lens 230 focuses the return light to an optical detector 232. Optical detector 232 detects the different light intensities received which correspond to the recorded amorphous and crystalline regions on the disk.

In the present invention, the reflectivity of the amorphous and crystalline states are reversed from that of the prior art. The signals from detector 232 are passed through a high speed inverter 240. The resulting data signals exiting inverter 240 are thus similar to data signals received from a regular phase change optical disk drive of the prior art.

The use of the disk 210 of the present invention in drive 200 has several advantages. Writing noise is an undesirable result of variation of the position or size of the written data spot. One source of writing noise is unpredictable temperature fluctuations. These result from variation of the laser power or the optical absorption of the media. The inverted structure of the present invention is less sensitive to writing noise. This is due to the fact that the liquid or amorphous state does not absorb as much of the incident light so it experiences less temperature (hence, spot size) variations for a given fluctuation of power or optical absorption.

Materials which crystallize more quickly such as GeTe or GeTeSb can be used in the active layer of the present invention. The cooling rate of the molten spot is higher because the maximum temperatures reached by the liquid are not as high as with a conventional structure. Less heat must diffuse out of the molten spot before it cools to the critical glass transition temperature and is quenched into an amorphous state. This allows materials such as GeTe or GeTeSb to be quenched into the amorphous state rather than immediately crystallizing. Prior to the present invention these materials would crystallize so quickly that they could not be transformed to the amorphous state, and were thus, unsuitable for use in the active layer. With these materials the disk can be rotated faster and achieve a greater media velocity. This allows data to be recorded at a higher rate.

"There are many types of optical phase change materials which may be used in the active layer of the present invention. There are chalcogenide materials such as GTS, GeTe, GeTeSb, InSbTe, InSeTl, GeSbTeTlAg, GeSbTeCo, SnSbTe, or GeTeSn or alloys thereof. Additionally, there are non-chalcogenide phase change materials such as GaSbIn, GaSb, SiGe, or their alloys which may be used in the active layer. All of these materials are optical phase change materials which have crystalline, amorphous, and liquid phases. In each of these materials the bulk reflectivity of the crystalline phase is greater than the reflectivities of the liquid and amorphous phases. The liquid and amorphous phases have reflectivities which are approximately equal. The liquid and amorphous phases are non-crystalline phases. The media of the present invention may have an active layer which comprises any of these suitable optical phase change materials. Any of these optical phase change materials may be substituted for GTS in the active layer of the preferred embodiment of the invention."

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical recording medium comprising:
   an active layer having a thickness less than approximately 500 Å, which is able to transmit light, comprised of an optical phase change material having a crystalline phase capable of melting to a liquid phase and then cooling to an amorphous phase, said crystalline phase having a bulk reflectivity greater than said amorphous and liquid phases;
   a dielectric layer which is able to transmit light, overlying the active layer, said dielectric layer being a thickness such that said amorphous and liquid phases have a higher reflectivity than said crystalline phase for light incident on the medium; and
   a reflective layer overlying the dielectric layer.

2. The medium of claim 1 further including:
   a substrate which is able to transmit light, located on one side of the active layer.

3. The medium of claim 1 further including:
   a substrate, which is able to transmit light;
   an undercoat layer, which is able to transmit light, located between the substrate and the active layer; and
   an overcoat layer overlying the reflective layer.

4. The medium of claim 1, wherein the active layer is comprised of a chalcogenide material.

5. The medium of claim 1, wherein the ratio Ar (the amount of light absorbed by the liquid phase divided by the amount of light absorbed by the crystalline phase) is less than 1.

6. The medium of claim 5, wherein Ar is approximately a minimum.

7. The medium of claim 5, wherein Ar is approximately 0.6.

8. The medium of claim 1, wherein the dielectric layer is of a thickness which is equal to the thickness at which the ratio Ar (the amount of light absorbed by the liquid phase divided by the amount of light absorbed by the crystalline phase) is approximately a minimum plus integer multiples of $\lambda/2n$, wherein $\lambda$ equals the wavelength of light and n equals the index of refraction of the dielectric layer.

9. The medium of claim 1, wherein the dielectric layer is between approximately 1600–1800 Angstroms thick.

10. The medium of claim 1, wherein the dielectric layer is approximately 1750 Angstroms thick.

11. The medium of claim 1, wherein the active layer is approximately 100 Angstroms thick.

12. The medium of claim 1, wherein the active layer is comprised of GTS.

13. The medium of claim 1, wherein the active layer is comprised of GeTe.

14. The medium of claim 1, wherein the active layer is comprised of GeTeSb.

15. The medium of claim 1, wherein the active layer is comprised of InSbTe.

16. The medium of claim 1, wherein the active layer is comprised of InSeTl.

17. The medium of claim 1, wherein the active layer is comprised of GeSbTeTlAg.

18. The medium of claim 1, wherein the active layer is comprised of GeSbTeCo.

19. The medium of claim 1, wherein the active layer is comprised of SnSbTe.

20. The medium of claim 1, wherein the active layer is comprised of GeTeSn.

21. The medium of claim 1, wherein the active layer is comprised of GaSbIn.

22. The medium of claim 1, wherein the active layer is comprised of GaSb.

23. The medium of claim 1, wherein the active layer is comprised of SiGe.

24. An optical data recording system comprising:
a recording medium comprising a substrate which is able to transmit light, an active layer having a thickness less than approximately 500 Å, which is able to transmit light, overlying said substrate, the active layer comprised of an optical phase change material having a crystalline phase capable of melting to a liquid phase and then cooling to an amorphous phase, said crystalline phase having a bulk reflectivity greater than said amorphous and liquid phases, a dielectric layer which is able to transmit light, overlying said active layer, and a reflective layer overlying said dielectric layer, wherein said dielectric layer is of a thickness such that said liquid phase reflects more light than said crystalline phase;
light generating means for producing a collimated first beam of light;
optical transmission means for directing said first beam of light to the medium;
optical separation means for receiving said first beam of light and a reflected beam of light from the medium and separating said first beam from said reflected beam; and
photodetector means for receiving said reflected beam of light from the optical separation means and generating a data signal responsive thereto.

25. The system of claim 24, further including:
an inverter connected to the photodetector means for inverting said data signal.

26. The system of claim 24, wherein the optical transmission means and the optical separation means comprise a polarizing beamsplitter, a quarter waveplate and a lens.

27. An optical recording medium comprising:
a substrate which is able to transmit light;
an active layer having a thickness less than approximately 500 Å, overlying the substrate, comprised of an optical phase change material having a crystalline phase capable of melting to a liquid phase and then cooling to an amorphous phase;
a dielectric layer, which is able to transmit light, overlying the active layer, the dielectric layer being between approximately 1600–1800 Å thick; and
a reflective layer overlying the dielectric layer.

28. The system of claim 27, wherein the dielectric layer is approximately 1750 Angstroms thick.

29. The system of claim 27, wherein the active layer is approximately 100 Angstroms thick.

30. The system of claim 27, wherein the active layer is comprised of GTS.

31. The medium of claim 27, wherein the active layer is comprised of GeTe.

32. The medium of claim 27, wherein the active layer is comprised of GeTeSb.

33. The medium of claim 27, wherein the active layer is comprised of InSbTe.

34. The medium of claim 27, wherein the active layer is comprised of InSeTl.

35. The medium of claim 27, wherein the active layer is comprised of GeSbTeTlAg.

36. The medium of claim 27, wherein the active layer is comprised of GeSbTeCo.

37. The medium of claim 27, wherein the active layer is comprised of SnSbTe.

38. The medium of claim 27, wherein the active layer is comprised of GeTeSn.

39. The medium of claim 27, wherein the active layer is comprised of GaSbIn.

40. The medium of claim 27, wherein the active layer is comprised of GaSb.

41. The medium of claim 27, wherein the active layer is comprised of SiGe.

42. The system of claim 27, further including:
an undercoat layer, which is able to transmit light, located between the substrate and the active layer; and
an overcoat layer overlying the reflective layer.

* * * * *